US008027747B2

(12) United States Patent
Schnabel et al.

(10) Patent No.: US 8,027,747 B2

(45) Date of Patent: Sep. 27, 2011

(54) METHOD FOR REGISTER CORRECTION OF A PROCESSING MACHINE, AND A PROCESSING MACHINE

(75) Inventors: Holger Schnabel, Rottendorf (DE); Stephan Schultze, Lohr-Wombach (DE)

(73) Assignee: Robert Bosch GmbH, Stuttgart (DE)

( * ) Notice: Subject to any disclaimer, the term of this patent is extended or adjusted under 35 U.S.C. 154(b) by 422 days.

(21) Appl. No.: 12/252,398

(22) Filed: Oct. 16, 2008

(65) Prior Publication Data

US 2009/0105869 A1 Apr. 23, 2009

(30) Foreign Application Priority Data

Oct. 17, 2007 (DE) ......................... 10 2007 049 670

(51) Int. Cl.
*G06F 19/00* (2011.01)

(52) U.S. Cl. ........................................ 700/124; 700/122

(58) Field of Classification Search .................. 700/122, 700/124, 126
See application file for complete search history.

(56) References Cited

U.S. PATENT DOCUMENTS 5,500,801 A * 3/1996 Loffler .......................... 700/122
5,988,063 A 11/1999 Brandenburg et al. ....... 101/219
2006/0129266 A1* 6/2006 Franz et al. ................... 700/122

FOREIGN PATENT DOCUMENTS

DE 197 40 153 3/1999
JP 2005324387 11/2005
JP 2007136776 6/2007
WO WO 2006114317 A2 * 11/2006

OTHER PUBLICATIONS

Machine Translation of JP2007-136776.*

* cited by examiner

*Primary Examiner* — Ryan Jarrett
(74) *Attorney, Agent, or Firm* — Michael J. Striker

(57) ABSTRACT

A method for the register correction of a processing machine for processing a continuous material, in particular a shaftless printing press, with which the continuous material is processed by at least two processing units with at least one compensator for adjusting the length of the continuous material in the continuous material section being provided upstream of each of the at least two processing units. In order to adjust the register of a first processing unit, the length of the continuous material of the continuous material section upstream of the first processing unit is adjusted by the compensator provided in this first continuous material section. To adjust the register of the first processing unit, the length of the continuous material of the continuous material section upstream of a second processing unit is also adjusted by the compensator provided in this second continuous material section. A related processing machine carries out the inventive method.

20 Claims, 4 Drawing Sheets

METHOD FOR REGISTER CORRECTION OF A PROCESSING MACHINE, AND A PROCESSING MACHINE

CROSS-REFERENCE TO RELATED APPLICATION

The invention described and claimed hereinbelow is also described in German Patent Application DE 10 2007 049 670.4-27 filed on Oct. 17, 2007. This German Patent Application, whose subject matter is incorporated here by reference, provides the basis for a claim of priority of invention under 35 U.S.C. 119(a)-(d).

BACKGROUND OF THE INVENTION

The present invention relates to a method for the register correction of a processing machine, and a related processing machine, a related computer program, and a related computer program product.

Although the text below refers mainly to printing presses, the present invention is not limited thereto, but rather is directed to all types of processing machines with which a continuous material and/or a material web is processed. The present invention may be used, in particular, with printing presses such as newspaper presses, jobbing presses, gravure presses, printing presses for packaging or currency, and processing machines such as bagging machines, envelope machines, or packaging machines. The continuous material may be paper, cardboard, plastic, metal, rubber, or foil, etc.

With the related processing machines, in particular printing presses, a continuous material is moved along by driven axles (web conveyance axles or devices), such as tension rollers or feed rollers, and by non-driven axles, such as breaker rollers, guide rollers, drying rollers, or cooling rollers. The continuous material is simultaneously processed, e.g., it is printed on, punched, cut, folded, etc., using processing axles, which are usually also driven. The driven axles influence the web tension and the processing register, e.g., a color or longitudinal register.

With printing presses, e.g., gravure presses, the longitudinal register is controlled, for instance, in order to obtain an optimal print result. A compensator is often used as the adjusting axle for the register correction. The compensator is a mechanical device located in the continuous material flow upstream of the printing unit that influences the length of the continuous material in the continuous material section upstream of the printing unit.

With color printing presses, in particular with gravure presses, colors must be printed directly one over the other in order to obtain a good printing result. If register deviations occur in the longitudinal register (color register), a register control may typically be carried out using compensators. In this case, the compensator upstream of the printing unit with the register deviation is displaced, which results in a shortening or lengthening of the path of the continuous material, i.e., the length of the continuous material in the particular material section upstream of the printing unit. As a result, the printed image produced by the printing unit is shifted in a stationary manner directly behind the compensator in proportion to the printed images produced by the other printing units.

At the instant when the shift is carried out, the web tension changes only in the web section located upstream of the printing unit with the register deviation. Due to the web conveyance, the change in web tension propagates into the subsequent web sections, which results in a register deviation and activates the register control of the subsequent printing units. Since this register deviation dies out, in principle, once the stationary state is reached, even without being regulated, control strategies are also known with which the register control of the subsequent printing units is deactivated until the deviation dies out.

The known solutions therefore have the disadvantage that the displacement of a compensator for longitudinal register correction is not decoupled. Due to the web conveyance, the difference in web tension propagates into the subsequent web sections, which results in the register control of the subsequent printing units being triggered, and/or it results in waste.

SUMMARY OF THE INVENTION

The present invention is therefore based on the object of improving the register correction of processing machines, in particular of better decoupling the adjustment of a compensator.

This object is attained via a method for register correction, a processing machine, a computer program, and a computer program product with the features of the independent claims. Advantageous refinements are the subject of the subclaims and the description below.

With the inventive method for register correction used with a processing machine for processing a continuous material, in particular a shaftless printing press, the continuous material is processed by at least two processing units, at least one compensator being provided—for adjusting the length of the continuous material in the continuous material section—in a continuous material section upstream of each of the at least two processing units. To adjust the register of a first processing unit, the length of the continuous material of the continuous material section upstream of the first processing unit is adjusted by the compensator provided in this first continuous material section. In addition, when the register of the first processing unit is adjusted, the length of the continuous material of the continuous material section upstream of a second processing unit is also adjusted by the compensator provided in this second continuous material section.

An inventive processing machine includes, in particular, all means for carrying out an inventive method.

Advantageously, a register control is carried out. One skilled in the technical art understands that the inventive adjustment may also be used as part of a regulating procedure. Via the inventive solution, i.e., coupling at least two compensators, the compensation of a register error is largely decoupled. In the preferred case of coupling all compensators, the web tension changes only in the material web section upstream of the processing unit to be corrected. As a result, only the register of the processing unit to be corrected is changed, without the subsequent processing unit being affected. No web tension differences are propagated via web conveyance into subsequent material web sections. As a result, a register correction of the subsequent processing axles need not be carried out when a processing axle is adjusted. Waste is reduced considerably as a result, and the processing accuracy is increased.

The references to “upstream” and “downstream” of a processing unit and/or a continuous material section refer to the direction of conveyance of the continuous material, i.e., the continuous material flow. The second continuous web section, i.e., the continuous web section upstream of the second processing unit, may be located in the continuous material flow upstream or downstream of the first continuous material section. Several second processing units and/or their associated compensators (in each case, the one located in the upstream continuous material section) may also be adjusted.

For example, a few or all of the compensators upstream of the compensator of the processing unit to be corrected may be adjusted. As an alternative or in addition thereto, it is possible to adjust a few or all of the compensators downstream of the compensator of the processing unit to be corrected.

Preferably, the compensator of the processing unit to be corrected, and all subsequent compensators, are adjusted. It is understood that it is also possible to adjust subsequent axles without associated compensators, e.g., web conveyance axles, such as the outfeed or clamping points in general. Several alternatives for adjusting the compensators and, optionally, web conveyance axles, are described below. With the embodiments described for subsequent compensators, the subsequent web conveyance axles may also be adjusted, with the adjustment taking place such that a change to the web tension in the web section upstream of the web conveyance axle to be adjusted is prevented, if possible (decoupling).

An unweighted, static adjustment of the subsequent compensators may take place, in which case the subsequent compensators are each acted upon with a control command that is identical and inverse to the first compensator. It is also possible to provide a weighted, static adjustment of the subsequent compensators, with which the subsequent compensators are acted upon with inverse adjustment commands that are weighted in different manners. An unweighted, dynamic adjustment of the subsequent compensators is also provided, with which the subsequent compensators are acted upon with adjustment commands that are identical but are changeable over time. The change over time may correspond, e.g., to a DT1 behavior, a PT1 behavior, a deadtime element, or combinations of these elements with any weighting factors. A weighted, dynamic adjustment of the subsequent compensators is also provided, with which the subsequent compensators are acted upon with adjustment commands that are weighted differently and that are changeable over time.

As an alternative or in addition to the adjustment of subsequent compensators/web conveyance axles described above, it is also possible to adjust compensators and, possibly, web conveyance axles (e.g., infeed) of compensators located upstream in the continuous material flow.

Advantageously, the adjustment should take place for each compensator with a different amplitude and time constant (weighted, dynamic adjustment), in order to optimally decouple the change in web tension in the material web sections upstream and/or downstream of the printing unit. The time-related adjustment is composed of the length of material web 1 and the machine speed (web conveyance speed) v, to form a web time constant that is proportional to 1/v.

Advantageously, the adjustment of the compensator (or the selected further compensators) provided in the second continuous material section includes a precontrol of the web tension behavior and/or the register behavior. It is advantageous when the precontrol of the one or more second compensators is carried out such that no change occurs in the web tension behavior in other web sections and/or in the register of other processing units. As described above, the precontrol of the coupled compensators may be carried out in a stationary manner, or it may include consideration for dynamic compensation processes.

Advantageously, the adjustment of the compensator provided in the second continuous material section is carried out with the aid of constant and/or dynamic elements, in particular PT1 elements, DT1 elements, and/or dead-time elements.

With a processing machine designed as a printing press with at least three printing units, a control of the color register is advantageously carried out by adjusting adjacent printing units (control relative to a precursor printing unit).

It is also advantageous with a processing machine designed as a printing press with at least three printing units that a control of the color register is carried out by adjusting at least one printing unit relative to a predetermined printing unit (control relative to a standard color).

In particular, the precursor color control and standard color control, or a combination thereof, are feasible. With a combination, it is possible, e.g., to carry out a precursor color control up to a certain printing unit (with a typically high print contrast), and, after that, to carry out a standard color control. According to a particularly preferred embodiment, a dynamic switch between these two methods is carried out.

It is recommended that controller parameters and/or controlled variables and/or setpoint values for adjusting the compensator provided in the second continuous material section be adapted in proportion to the reciprocal of the conveyance speed of the continuous material, and/or in proportion to the length of the continuous material in a continuous material section. It is provided that the time constant be selected such that it is proportional to 1/web speed. By making a stronger adjustment of the coupled compensators, it is possible to more quickly attain a compensation of the web tension difference and, therefore, to more quickly compensate for the start-up procedure of the register. In the meantime, the adjustment of the compensator is traced back to the actual register deviation, with consideration for the web time constants (analogous to a P or D component of a PID controller). In addition, the time constant is proportional to the length of the continuous material sections. The web tension difference in a smaller material web section may be decoupled via further clamping points in the machine between two processing units. It is provided that controller parameters and/or controlled variables and/or setpoint values for adjusting the compensator provided in the second continuous material section be identified by an observer, with the identification preferably being determined based on a model calculated in the control system.

The present invention also relates to a computer program with program code means for implementing all steps for controlling the controllers according to an inventive method when the computer program is run on a computer or a related arithmetic unit, in particular in an inventive processing machine.

The computer program product—which is provided according to the present invention—with program code means, which are stored on a computer-readable data storage device, is suitable for carrying out all steps for controlling the compensators according to an inventive method when the computer program is run on a computer or a related arithmetic unit, in particular in a processing machine. Suitable data storage devices are, in particular, diskettes, hard drives, Flash drives, EEPROMs, CD-ROMs, DVDs, etc. It is also possible that a program could be downloaded from computer networks (Internet, intranet, etc.).

Further advantages and embodiments of the present invention result from the description and the attached drawing.

It is understood that the features mentioned above and to be described below can be used not only in the combination described, but also in other combinations or alone without leaving the framework of the present invention.

The present invention is depicted schematically with reference to exemplary embodiments in the drawing, and it is described in detail below with reference to the drawing.

DESCRIPTION OF THE PREFERRED EMBODIMENTS

Figure 1:
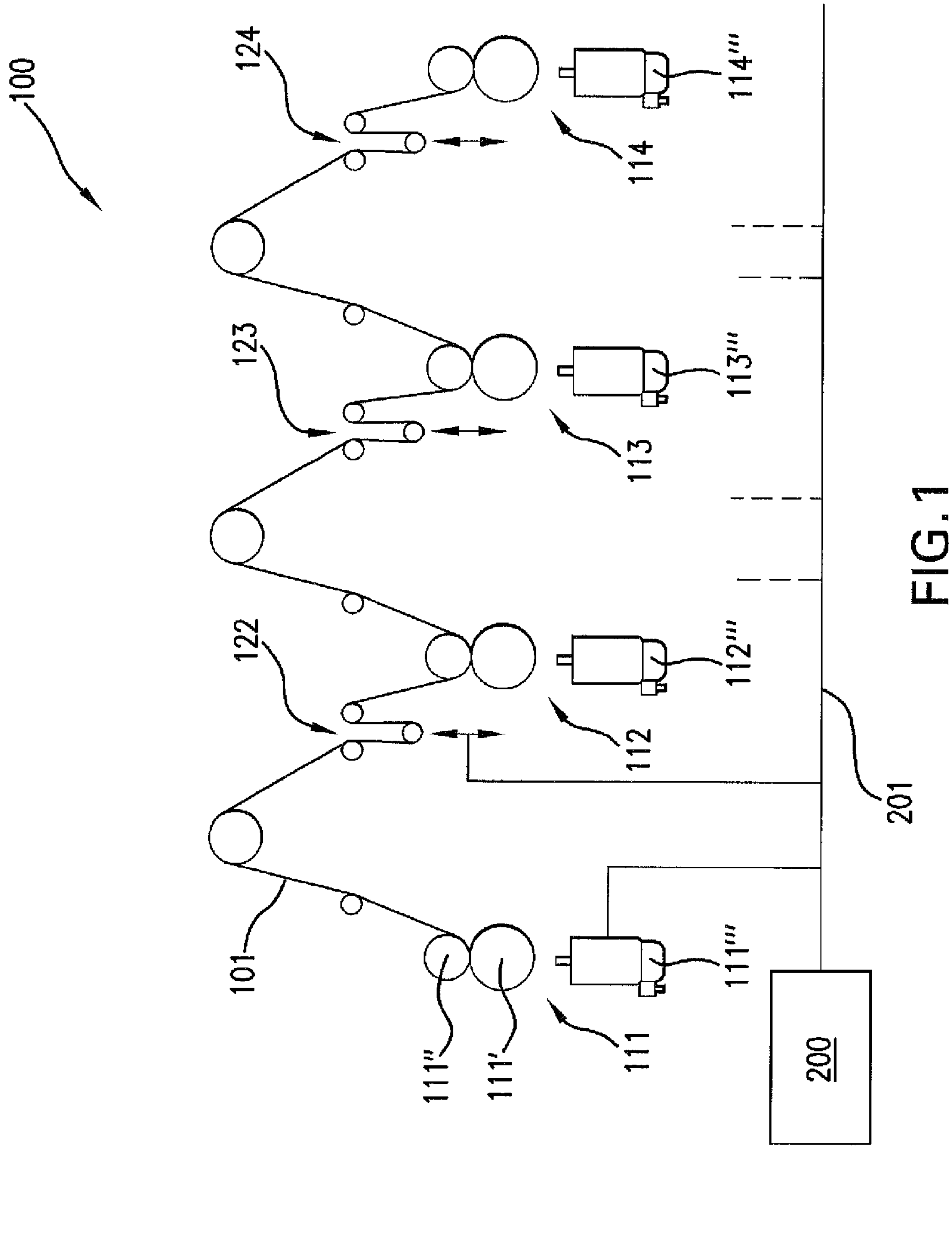
FIG. 1 is a schematic depiction of a preferred embodiment of an inventive processing machine that is designed as a printing press.

A preferred embodiment of an inventive processing machine that is designed as a printing press is labeled as a whole with reference numeral 100. A material to be printed on, e.g., paper 101, is supplied to the machine via an infeed, which is not shown. Paper 101 is then guided through processing units, which are designed as printing units 111, 112, 113, 114, and they are printed on, then they are output via an outfeed, which is not shown. The infeed, outfeed, and printing units are located such that they may be positioned, in particular such that their cylinders or angles may be corrected. Printing units 111 through 114 are located in a web tension-controlled region between the infeed and the outfeed.

Printing units 111 through 114 each include an impression cylinder, against each of which a pressure roller is pressed with strong pressure. For clarity, only impression cylinder 111' and pressure roller 111" of printing unit 111 are labeled with reference numerals. The impression cylinders may be driven individually and independently of each other. Associated drives 111'" through 114'" are depicted schematically. The pressure rollers are designed such that they may rotate freely. Printing units 111 through 114 form—with paper 101 passing through them—one unit that is connected via a friction connection (clamping point). The drives of the individual units are connected with a control device 200 via a data connection 201. For clarity, the connection of drives 112'" through 114'" is depicted schematically.

In the web sections between individual printing units 111 through 114, paper 101 is initially guided via a few rollers, and via a compensator 122 through 124. Compensators 122 through 124 are adjustable mechanical devices, which are located in continuous material flow upstream of associated printing unit 112, 113, 114, and they influence the length of the continuous material in the web section upstream of the printing unit. An adjustment to a compensator results in a change to the register of subsequent printing unit. For example, compensator 122 is adjusted in order to adjust the register of printing unit 112, compensator 123 is adjusted in order to adjust the register of printing unit 113, and compensator 124 is adjusted in order to adjust the register of printing unit 114. If the length or path of the material web is extended in the web section upstream of the printing unit by adjusting the compensator, the web tension in the material web section upstream of the related printing unit increases. If it is shortened, the web tension decreases. In the moment when the shift takes place, the web tension changes only in the related material web section. Due to the web conveyance, which takes place as a function of the web time constants TN=1/v, the web tension difference is also conveyed into subsequent material web sections with a time delay. Quantity 1 refers to the length of the material web in the material web section whose web path length was changed via a compensator shift. Quantity v refers to the material web and/or conveyance speed. For adjustment purposes, the compensators are also connected via data connection 201 with control device 200, which contains an arithmetic unit for controlling the compensators.

In the related art, the longitudinal register error that occurs at one printing unit is regulated by shifting a single compensator. This compensator is always located upstream of the related printing unit. If, however, a register deviation occurs with the preferred embodiment of the present invention shown, all subsequent compensators are also adjusted with an amplitude and time constants that are determined accordingly. The effects on the web tension in the individual web sections is described below with reference to FIGS. 2*a* and 2*b*.

Figure 2A:
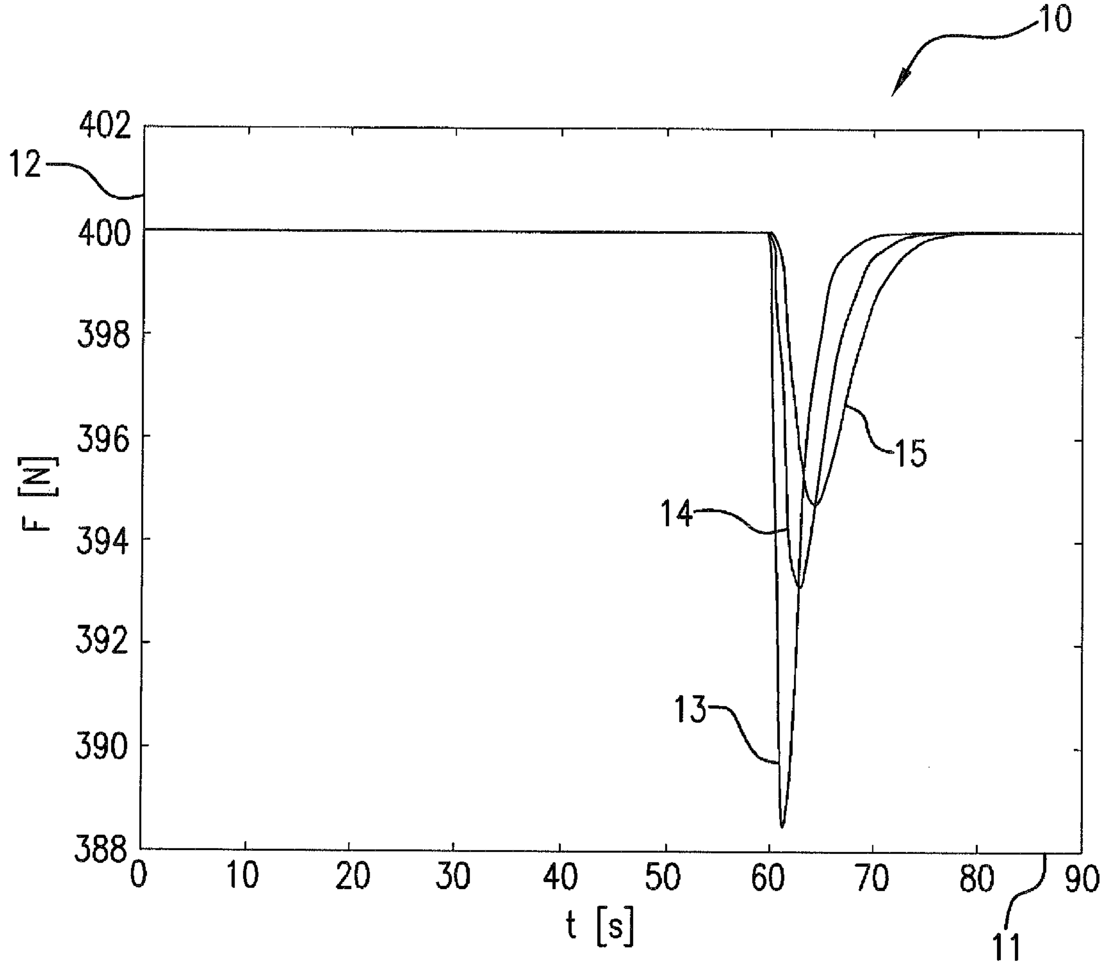
FIG.2a Prior Art
FIG. 2*a* shows, schematically, a dependence of a web tension on time when a compensator is being adjusted according to the related art.

FIG. 2*a* shows the course of a web tension over time, plotted in a diagram 10, in which three web tension curves 13, 14, 15 are shown. In diagram 10, the web tension is plotted on a y-axis 12 against time t, which is represented by x-axis 11. The example shown shows the adjustment of a compensator without adjusting further compensators (related art).

Diagram 10 shows three web tension curves 13, 14, 15, which are assignable to various web sections. A web section is limited by two clamping points. With reference to FIG. 1, three web sections could therefore be identified between printing units 111 and 114. For example, web tension curve 13 could be assigned to the web section between printing units 111 and 112, web tension curve 14 could be assigned to the web section between printing units 112 and 113, and web tension curve 15 could be assigned to the web section between printing units 113 and 114.

The web tension behavior depicted in FIG. 2*a* results, in the related art, by the fact that the change in web tension brought about by the shift of a compensator propagates into subsequent web sections.

In contrast, with an inventive means, the propagation of the change in web tension is prevented, as explained with reference to FIG. 2*b*.

Figure 2B:
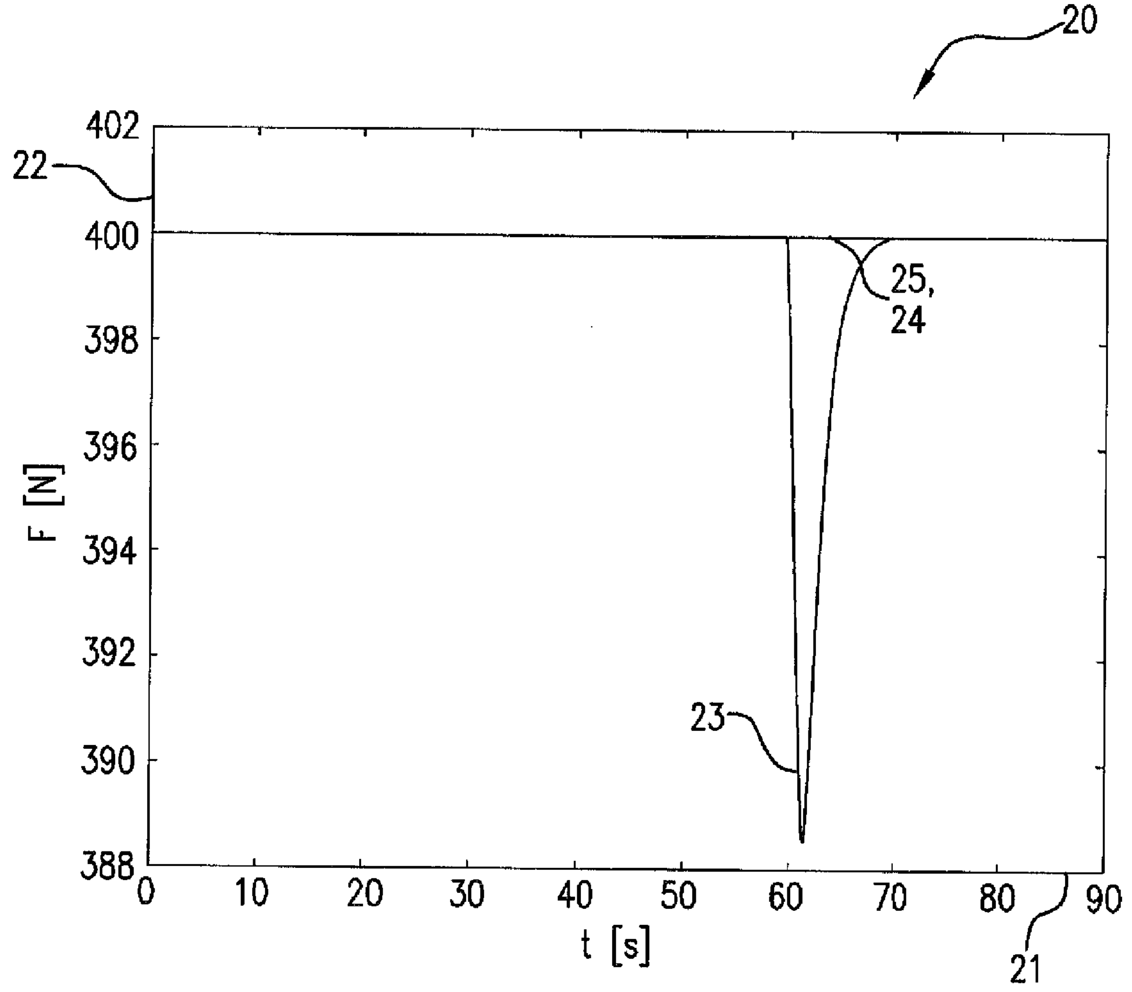
FIG. 2*b* shows, schematically, a dependence of a web tension on time when several compensators are adjusted in a coupled manner, according to a preferred embodiment of the present invention.

FIG. 2*b* shows the course of a web tension over time, plotted in a diagram 20, in which three web tension curves 23, 24, 25 are shown. In diagram 20, the web tension is plotted on a y-axis 22 against time t, which is represented by x-axis 21. In FIG. 2*b*, the web tension curve of printing press 100 according to FIG. 1 is shown, in which case compensator 122 is adjusted at time t=60 s, in order to correct a register error in printing unit 112. This is described via web tension curve 23. By precontrolling subsequent compensators 123, 124 in a targeted manner, and with consideration for the time-related dependencies, it is possible to completely decouple the register control in the related material web section. Due to the precontrol and/or coupling of the compensators, the web tension does not change in the web section between printing unit 112 and 113 (web tension curve 24) or in the web tension section between printing unit 113 and 114 (web tension curve 25). Errors that may occur during compensation processes may therefore be reduced or prevented. To keep the web tension as constant as possible in all subsequent web sections, it is advantageous to also adjust the subsequent outfeed in a time-dependent manner.

Preferred alternatives to the coupled adjustment of compensators according to FIG. 1 are shown in FIGS. 3*a* through 3*d*. The adjusting command for compensator 122 is shown in the columns to the left in FIGS. 3*a* through 3*d*. The adjusting command for compensator 123 is depicted in the center column. The adjusting command for compensator 124 is depicted in the column to the right. Regulating distance s is plotted against time t in the diagrams.

To correct a register deviation with printing unit 112, compensator 122 is acted upon with a specified adjusting command. There are various possibilities for acting upon subsequent compensators 123 and 124, of which particularly preferred embodiments will be described below.

Figure 3A:
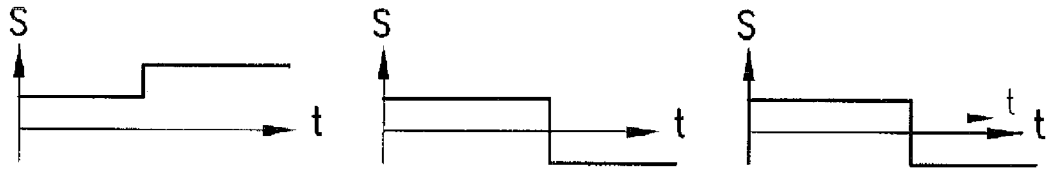
FIGS. 3*a* through 3*d* are schematic illustrations of alternative embodiments of an inventive coupling of three compensators.

FIG. 3*a* shows an unweighted, static co-adjustment of the subsequent compensators with which the subsequent compensators are acted upon with the identical—although inverse—adjustment command.

Figure 3B:
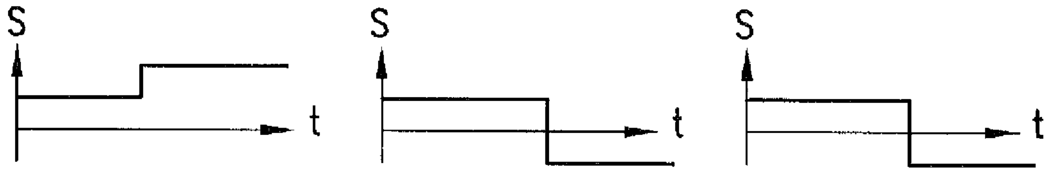

FIG. 3*b* shows a weighted, static co-adjustment of the subsequent compensators with which the subsequent compensators are acted upon with inverse adjustment commands that are weighted in different manners.

Figure 3C:
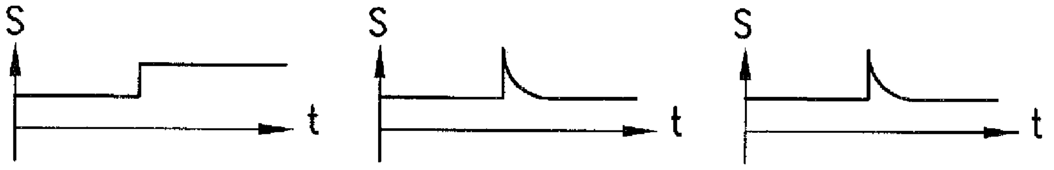

FIG. 3*c* shows an unweighted, dynamic adjustment of the subsequent compensators, with which the subsequent compensators are acted upon with adjustment commands that are identical and inverse, but that are changeable over time. The time-related change may correspond, e.g., to a PT1 behavior.

Figure 3D:
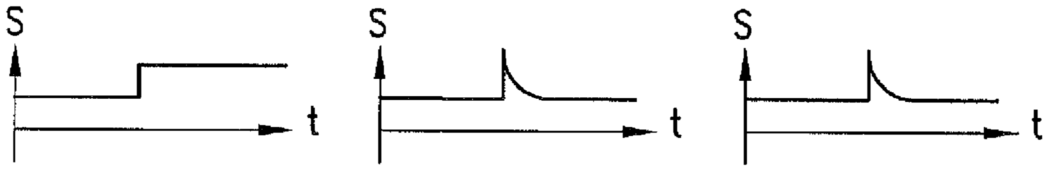

FIG. 3*d* shows a weighted, dynamic adjustment of the subsequent compensators, with which the subsequent compensators are acted upon with adjustment commands that are inverse, weighted differently, and are changeable over time.

It is understood that the embodiments of the present invention depicted in the figures are merely examples. Any other type of embodiment is also feasible, without leaving the framework of the present invention.

It will be understood that each of the elements described above, or two or more together, may also find a useful application in other types of methods and constructions differing from the types described above.

While the invention has been illustrated and described as embodied in a method for registering correction of a processing machine, and a processing machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

The invention claimed is:

1. A method for a register correction of a processing machine for processing a web, comprising the steps of:

processing the web by at least two processing units;

adjusting a length of the web in a web section with at least one compensator being provided upstream of each of the at least two processing units;

in order to adjust a register of a first processing unit, adjusting the length of the web of a web section upstream of the first processing unit by the compensator provided in this first web section;

to adjust a register of the first processing unit, also adjusting the length of the web of the web section upstream of a second processing unit by the compensator provided in this second web section.

2. A method as defined in claim 1, further comprising regulating the register of the first processing unit.

3. A method as defined in claim 1, further comprising also adjusting a web conveyance axle to adjust the register of a first processing unit.

4. A method as defined in claim 1, further comprising including, in the adjustment of the compensator provided in the second web section, precontrolling of a behavior selected from the group consisting of a web tension behavior, a register behavior, and both.

5. A method as defined in claim 1, further comprising carrying out the adjustment of the compensator provided in the second web section with elements selected from the group consisting of constant elements, dynamic elements, and both.

6. A method as defined in claim 5, further comprising using as the dynamic elements, elements selected from the group consisting of PT1 elements, DT1 elements, dead-time elements, and a combination thereof.

7. method as defined in claim 1, for the processing machine configured as a printing press with at least three printing units, further comprising carrying out a regulation of a color register by adjusting adjacent printing units.

8. A method as defined in claim 1, for the processing machine configured as a printing press with at least three printing units, further comprising carrying out a regulation of a color register by adjusting at least one printing unit relative to a predetermined printing unit.

9. A method as defined in claim 1, further comprising adopting parameters selected from the group consisting of controller parameters, controlled variables, setpoint values for adjusting the compensator, and a combination thereof provided in the second web section in proportion to reciprocals of a transport speed of the web.

10. A method as defined in claim 1, further comprising identifying by an observer parameter selected from the group consisting of controller parameters, controlled variables, setpoint values for adjusting the compensator, and a combination thereof provided in the second web section.

11. A method as defined in claim 10, further comprising determining the identification using a model calculated in a control system.

12. A method as defined in claim 1, further comprising adopting parameters selected from the group consisting of controller parameters, controlled variables, setpoint values for adjusting the compensator, and a combination thereof provided in the second web section to web length of a web section.

13. A method as defined in claim 12, further comprising using as the web section the first web section.

14. A method as defined in claim 1 for a register correction of the processing machine for processing the web configured as a shaftless printing press.

15. A processing machine for processing a web, comprising:

at least two processing units for processing the web;

at least one compensator in a web section upstream of each of the at least two processing units for adjusting a length of the web in the web section;

an arithmetic unit programmed—in order to adjust a register of a first processing unit—to adjust a length of the web of the web section upstream of the first processing unit via the compensator provided in this first web section, and to adjust the length of the web of the web section upstream of a second processing unit via the compensator provided in this second web section.

16. A processing machine as defined in claim 15, wherein the processing machine for processing a web is configured as a shaftless printing press.

17. A computer program product stored on a non-transitory computer-readable data storage device configured to be run on a computer or related arithmetic unit, comprising:

program code for causing to be performed a method for a register correction of a processing machine for processing a web, said program code comprising:

code for causing a processing of the web by at least two processing units;

code for causing an adjustment of a length of the web in a web section with at least one compensator being provided upstream of each of the at least two processing units;

in order to adjust a register of a first processing unit, code for causing an adjustment of the length of the web of a web section upstream of the first processing unit by the compensator provided in this first web section;

to adjust a register of the first processing unit, code for causing also an adjustment of the length of the web of the web section upstream of a second processing unit by the compensator provided in this second web section.

18. A computer program product stored on a non-transitory computer-readable data storage device as defined in claim 17, wherein the computer or the related arithmetic unit is part of a processing machine comprising at least two processing units for processing the web; at least one compensator in a web section upstream of each of the at least two processing units for adjusting a length of the web in the web section; an arithmetic unit programmed—in order to adjust a register of a first processing unit—to adjust a length of the web of the web section upstream of the first processing unit via the compensator provided in this first web section, and to adjust the length of the web of the web section upstream of a second processing unit via the compensator provided in this second web section.

19. A computer program product with program code means that are stored on a non-transitory computer-readable data storage device, in order to carry out all steps to control the compensators of the method as recited in claim 1 when the computer program product is run on a computer or a related arithmetic unit.

20. A computer program product with program code means that are stored on a non-transitory computer-readable data storage device as defined in claim 19, wherein the computer program product is run on the computer or the related arithmetic unit in the processing machine as recited in claim 15.

* * * * *